United States Patent
Ellis (12)

(10) Patent No.: US 10,286,636 B1
(45) Date of Patent: May 14, 2019

(54) FABRIC-BASED ITEMS WITH THREE-DIMENSIONAL SHAPES

(71) Applicant: Apple Inc., Cupertino, CA (US)

(72) Inventor: Shane Ellis, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 423 days.

(21) Appl. No.: 15/054,400

(22) Filed: Feb. 26, 2016

(51) Int. Cl.
| | |
|---|---|
| *B29C 51/00* | (2006.01) |
| *B32B 27/12* | (2006.01) |
| *B29C 51/14* | (2006.01) |
| *B32B 5/02* | (2006.01) |
| *B32B 27/40* | (2006.01) |
| *B32B 3/28* | (2006.01) |
| *B29K 101/10* | (2006.01) |
| *B29K 101/12* | (2006.01) |

(52) U.S. Cl.
CPC ............ *B32B 27/12* (2013.01); *B29C 51/004* (2013.01); *B29C 51/14* (2013.01); *B32B 3/28* (2013.01); *B32B 5/024* (2013.01); *B32B 27/40* (2013.01); *B29K 2101/10* (2013.01); *B29K 2101/12* (2013.01); *B32B 2250/03* (2013.01)

(58) Field of Classification Search
None
See application file for complete search history.

(56) References Cited

U.S. PATENT DOCUMENTS

| | | | | |
|---|---|---|---|---|
| 3,616,013 | A | * | 10/1971 | Bocchi ................... B31B 70/00 |
| | | | | 156/224 |
| 4,532,099 | A | * | 7/1985 | Kaji ...................... B29B 15/105 |
| | | | | 156/176 |
| 4,883,632 | A | | 11/1989 | Goto et al. |
| 6,066,217 | A | | 5/2000 | Dibble et al. |
| 6,849,319 | B2 | | 2/2005 | Cree et al. |
| 2007/0151655 | A1 | | 7/2007 | Keller et al. |
| 2010/0248573 | A1 | | 9/2010 | Hascalovich |
| 2016/0031164 | A1 | | 2/2016 | Downs et al. |

FOREIGN PATENT DOCUMENTS

EP        0930861        11/1996

* cited by examiner

*Primary Examiner* — Monica A Huson
(74) *Attorney, Agent, or Firm* — Treyz Law Group, P.C.; Kendall W. Abbasi

(57) ABSTRACT

A fabric-based item may be vacuum-formed into a three-dimensional shape. The fabric-based item may include one or more layers of fabric and one more polymer layers that can be molded when heated. To vacuum-form the fabric-based item into a three-dimensional shape, the fabric based item may be heated until the polymer layer reaches a forming temperature and becomes soft and pliable. When heated, a vacuum tool is used to pull the fabric-based item onto a mold so that the fabric-based item conforms to the shape of the mold. As the fabric-based item cools on the mold, the polymer material hardens into the shape imparted by the mold. The polymer material is able to hold the fabric layers in this shape after the layers are removed from the mold.

17 Claims, 10 Drawing Sheets

FABRIC-BASED ITEMS WITH THREE-DIMENSIONAL SHAPES

BACKGROUND

This relates generally to fabric-based items and, more particularly, to fabric-based items having three-dimensional shapes.

It may be desirable to form bags, furniture, clothing, and other items from materials such as fabric. To form a three-dimensional object, fabric is typically cut and joined at the edges to form the desired shape. Forming objects by joining separate pieces of fabric together in this way results in seams along the edges of the object. Seams can be visually unappealing and can create weak points in the structure of the object.

To reduce the number of seams in an object, some fabrics are compression molded into the desired three-dimensional shape. Compression molding involves applying heat and pressure to a laminated fabric to form the desired shape. While this method reduces the number of seams, the compression molding process can impart undesirable characteristics onto the fabric. For example, compression of the fabric can cause the texture of the mold to be transferred onto the fabric or it can lead to surface deformations that compromise the original look and feel of the fabric.

SUMMARY

A fabric-based item may be vacuum-formed into a three-dimensional shape. The three-dimensional shape may be that of a case or cover for an electronic device, a bag, a backpack, a wristband, or other suitable object.

The fabric-based item may include one or more layers of fabric and one more polymer layers that can be molded when heated. The polymer layer may, for example, be a thermoplastic or thermosetting polymer.

To vacuum-form the fabric-based item into a three-dimensional shape, the fabric based item may be heated until the polymer layer reaches a forming temperature and becomes soft and pliable. When heated, a vacuum tool is used to pull the fabric-based item onto a mold so that the fabric-based item conforms to the shape of the mold. As the fabric-based item cools on the mold, the polymer material hardens into the shape imparted by the mold. The polymer material is able to hold the fabric layers in this shape after the layers are removed from the mold.

The texture, amount of rigidity, and appearance of the fabric-based item can be varied across different regions of the fabric-based item by selectively applying heat to only some portions of the fabric-based item during the forming process, by selectively cooling some portions of the fabric-based item during the forming process, and/or by selectively blocking one or more openings through which air is vacuumed during the forming process.

The construction of the fabric-based item itself may also be altered to obtain regions with varying flexibility, appearance, or structure. For example, a stiffener may be incorporated into one or more regions of the fabric-based item, a release liner may be used during the forming process and subsequently removed to expose the hardened polymer layer, layers in the fabric-based item may have openings or regions of reduced thickness to increase flexibility in certain regions, and/or other fabric constructions may be used.

DETAILED DESCRIPTION

Figure 1:
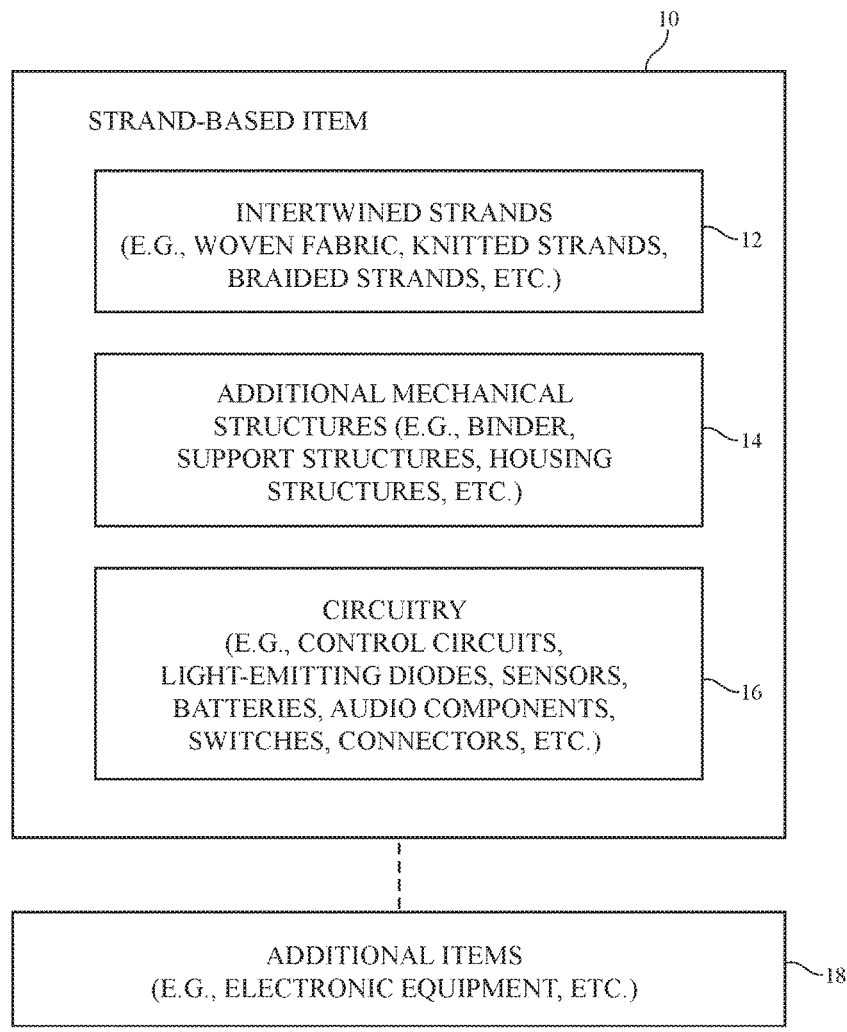
FIG. 1 is a schematic diagram of an illustrative fabric-based item in accordance with an embodiment.

Strands of material may be incorporated into strand-based items such as strand-based item 10 of FIG. 1. Item 10 may be an electronic device or an accessory for an electronic device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which fabric-based item 10 is mounted in a kiosk, in an automobile, airplane, or other vehicle, other electronic equipment, or equipment that implements the functionality of two or more of these devices. If desired, item 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, etc.), or may be any other suitable strand-based item.

Strands in strand-based item 10 may form all or part of a housing wall for an electronic device, may form internal structures in an electronic device, or may form other strand-based structures. Strand-based item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials.

Item 10 may include intertwined strands 12. The strands may be intertwined using strand intertwining equipment such as weaving equipment, knitting equipment, braiding equipment, or equipment that intertwines strands by entangling the strands with each other in other ways (e.g., to form felt). Intertwined strands 12 may, for example, form woven or knitted fabric or other fabric (i.e., item 10 may be a fabric-based item), a braided cord, etc.

Strands 12 may be single-filament strands or may be threads, yarns, or other strands that have been formed by intertwining multiple filaments of material together. Strands 12 may be formed from polymer, metal, glass, graphite, ceramic, natural fibers such as cotton, bamboo, wool, or other organic and/or inorganic materials and combinations of these materials. Strands 12 may be insulating or conductive.

Conductive coatings such as metal coatings may be formed on non-conductive strands (e.g., plastic cores) to make them conductive and strands such as these may be coated with insulation or left bare. Reflective coatings such as metal coatings may be applied to strands 12 to make them reflective. Strands 12 may also be formed from single-filament metal wire, multifilament wire, or combinations of different materials.

Strands 12 may be conductive along their entire length or may have conductive segments (e.g., metal portions that are exposed by locally removing insulation or that are formed by adding a conductive layer to a portion of a non-conductive strand.). Threads and other multifilament yarns that have been formed from intertwined filaments may contain mixtures of conductive fibers and insulating fibers (e.g., metal strands or metal coated strands with or without exterior insulating layers may be used in combination with solid plastic fibers or natural fibers that are insulating).

Item 10 may include additional mechanical structures 14 such as polymer binder to hold strands 12 together, support structures such as frame members, housing structures (e.g., an electronic device housing), and other mechanical structures.

Circuitry 16 may be included in item 10. Circuitry 16 may include components that are coupled to strands 12, components that are housed within an enclosure formed by strands 12, components that are attached to strands 12 using welds, solder joints, adhesive bonds (e.g., conductive adhesive bonds), crimped connections, or other electrical and/or mechanical bonds. Circuitry 16 may include metal structures for carrying current, integrated circuits, discrete electrical components such as resistors, capacitors, and inductors, switches, connectors, light-emitting components such as light-emitting diodes, audio components such as microphones and speakers, vibrators, solenoids, piezoelectric devices, and other electromechanical devices, connectors, microelectromechanical systems (MEMs) devices, pressure sensors, light detectors, proximity sensors, force sensors, moisture sensors, temperature sensors, accelerometers, gyroscopes, compasses, magnetic sensors, touch sensors, and other sensors, components that form displays, touch sensors arrays (e.g., arrays of capacitive touch sensor electrodes to form a touch sensor that detects touch events in two dimensions), and other input-output devices. Circuitry 16 may also include control circuitry such as non-volatile and volatile memory, microprocessors, application-specific integrated circuits, system-on-chip devices, baseband processors, wired and wireless communications circuitry, and other integrated circuits.

Item 10 may interact with electronic equipment or other additional items 18. Items 18 may be attached to item 10 or item 10 and item 18 may be separate items that are configured to operate with each other (e.g., when one item is a case and the other is a device that fits within the case, etc.). Circuitry 16 may include antennas and other structures for supporting wireless communications with item 18. Item 18 may also interact with strand-based item 10 using a wired communications link or other connection that allows information to be exchanged.

In some situations, item 18 may be an electronic device such as a cellular telephone, computer, or other portable electronic device and strand-based item 10 may form a case or other structure that receives the electronic device in a pocket, an interior cavity, or other portion of item 10. In other situations, item 18 may be a wrist-watch device or other electronic device and item 10 may be a strap or other strand-based item that is attached to item 18. In still other situations, item 10 may be an electronic device, strands 12 may be used in forming the electronic device, and additional items 18 may include accessories or other devices that interact with item 10.

If desired, magnets and other structures in items 10 and/or 18 may allow items 10 and 18 to interact wirelessly. One item may, for example, include a magnet that produces a magnetic field and the other item may include a magnetic switch or magnetic sensor that responds in the presence of the magnetic field. Items 10 and 18 may also interact with themselves or each other using pressure-sensitive switches, pressure sensors, force sensors, proximity sensors, light-based sensors, interlocking electrical connectors, etc.

The strands that make up item 10 may be intertwined using any suitable strand intertwining equipment. For example, strands 12 may be woven or knitted together to form a fabric. The fabric may have a plain weave, a satin weave, a twill weave, or variations of these weaves, may be a three-dimensional woven or knitted fabric, may be a warp knit fabric, or may be other suitable fabric. If desired, the strands that make up item 10 may be intertwined using knitting equipment, braiding equipment, or other strand intertwining equipment. Item 10 may also incorporate more than one type of fabric or intertwined strand-based material (e.g., item 10 may include both woven and knitted portions).

Figure 2:
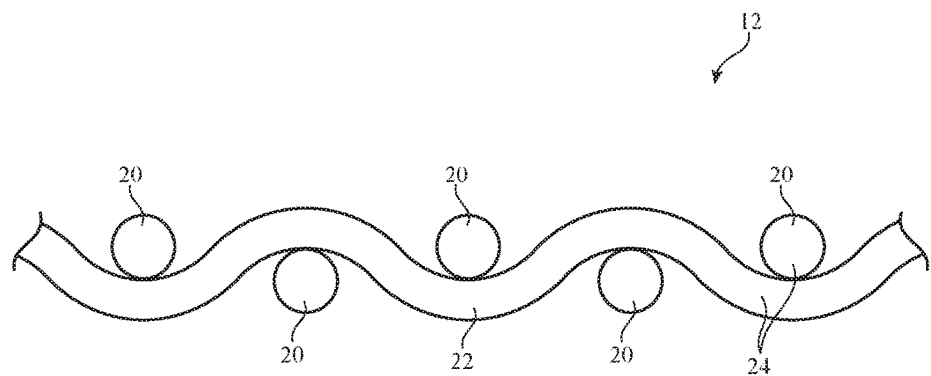
FIG. 2 is a cross-sectional side view of illustrative fabric in accordance with an embodiment.

A cross-sectional side view of illustrative woven fabric 12 is shown in FIG. 2. As shown in FIG. 2, fabric 12 may include yarns or other strands of material such as warp strands 20 and weft strands 22. In the illustrative configuration of FIG. 2, fabric 12 has a single layer of woven strands. Multi-layer fabric constructions may be used for fabric 12 if desired.

Fabric-based item 10 may include non-fabric materials (e.g., structures formed from plastic, metal, glass, ceramic, crystalline materials such as sapphire, etc.). These materials may be formed using molding operations, extrusion, machining, laser processing, and other fabrication techniques. In some configurations, some or all of fabric-based item 10 may include one or more layers of material such as layers 26 of FIG. 3. Layers 26 may include layers of fabric 12 and layers of structural material 48. Structural material 48 may be formed from materials such as polymer, metal, glass, fabric, adhesive, crystalline materials, ceramic, patterned layers of material, and/or other layers. Structural material 48 may be used to hold fabric 12 in a desired three-dimensional shape. In the absence of structural material 48, fabric 12 may be very pliable and soft, making it difficult to maintain a three-dimensional shape. Structural material 48 may be used to increase the rigidity and structure in fabric 12 so that fabric 12 can maintain a desired three-dimensional shape. The amount of rigidity provided by structural material 48 may be adjusted to achieve the desired structure in fabric 12. For example, structural material 48 may be configured to create very hard and rigid portions of fabric 12 or it may be configured to only slightly increase the rigidity of fabric 12 so that fabric 12 remains pliable and soft while still maintaining some shape and structure.

Structural material 48 may, for example, include one or more layers of polymer that are sandwiched between layers of fabric 12. The polymer material may be a thermoplastic polymer material, a thermoset polymer material, or other adhesive material that becomes soft when heated to an appropriate temperature. To form fabric 12 into a three-dimensional shape, the polymer layers between fabric layers 12 (e.g., structural layers 48) may be heated until they become soft enough to mold into the desired three-dimensional form (e.g., using a mold). As the adhesive cools, the adhesive becomes more rigid and holds its shape within fabric 12. Because structural material 48 is sometimes formed from a polymer adhesive, material 48 may sometimes be referred to as adhesive material 48 or polymer material 48.

Figure 3:
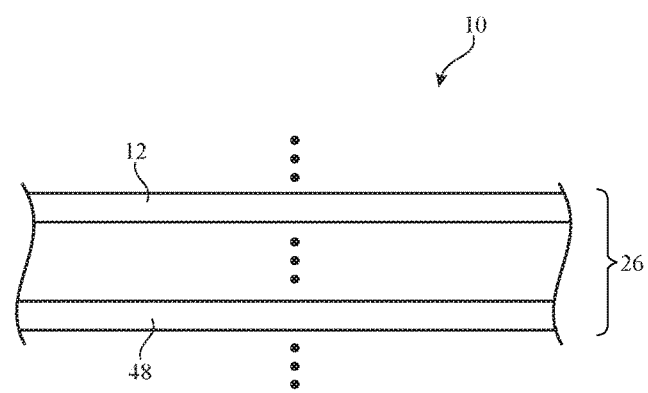
FIG. 3 is a cross-sectional side view of layers of material that may be incorporated into a fabric-based item in accordance with an embodiment.

The example of FIG. 3 in which structural material 48 is formed as a separate layer between layers of fabric 12 is merely illustrative. If desired, structural material 48 may be embedded in, integral with, intertwined with, or otherwise incorporated into fabric layers 12.

If desired, layers 26 of fabric 12 and structural material 48 may be formed into a desired shape using vacuum-forming techniques. Using this method, layers 26 are heated until material 48 becomes soft. While material 48 is soft and pliable, layers 26 are placed over a mold while a vacuum tool pulls air through holes under the mold. This forces layers 26 onto the mold and causes layers 26 to conform to the shape of the mold. Adhesive material 48 is then allowed to cool and harden while layers 26 remain on the mold. Once cooled, layers 26 are removed from the mold. The hardened adhesive material 48 in layers 26 is sufficiently stiff to hold fabric 12 in the shape imparted by the mold. Vacuum forming fabric into a three-dimensional shape may reduce or eliminate seams in the fabric-based item while preserving the texture and appearance of the fabric (e.g., texture and appearance characteristics which would be compromised if the fabric were formed using compression molding techniques).

Figure 4:
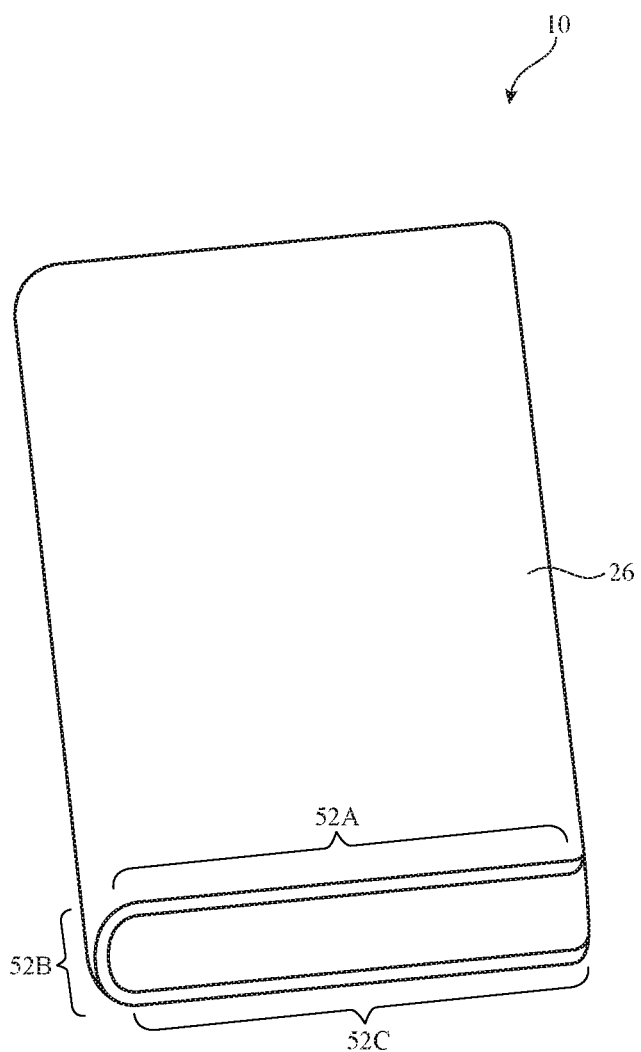
FIGS. 4, 5, 6, 7, and 8 are perspective views of illustrative three-dimensional shapes that may be formed using fabric in accordance with an embodiment.

Illustrative three-dimensional objects that may be formed using vacuum-forming techniques are shown in FIGS. 4, 5, 6, 7, and 8. In the example of FIG. 4, layers 26 have been formed into a book-like shape having a first planar portion 52A, a middle portion 52B, and a second planar portion 52C. The shape of FIG. 4 illustrates how it may be desirable to have different portions of fabric-based item 10 with different levels of rigidity. In some arrangements, it may be desirable to have first and second planar portions 52A and 52C be more rigid than middle portion 52B. Middle portion 52B may be configured to flex back and forth (e.g., middle portion 52B may transition between a C-shape, a flat shape, and a backwards C-shape, whereas planar portions 52A and 52C may remain substantially flat). This allows middle portion 52B to be bent back and forth, thereby rotating first planar portion 52A relative to second planar portion 52C. This type of configuration may be used in forming foldable fabric-based displays or other foldable items.

In other configurations, it may be desirable to have middle portion 52B more rigid than planar portions 52A and 52C. For example, in configurations where fabric-based item 10 forms a bag, middle portion 52B may form a portion of the bag that rests on the ground, while portions 52A and 52C may form the sides of the bag. It may be desirable to have a certain amount of slouch in the sides of the bag (e.g., portions 52A and 52C), while portion 52B that rests on the ground remains flat and rigid or semi-rigid.

Figure 5:
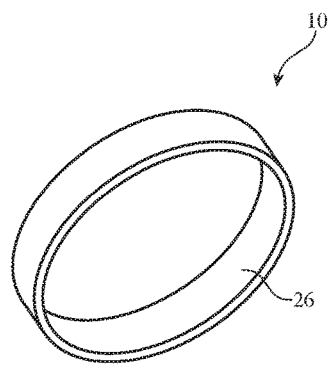
Figure 6:
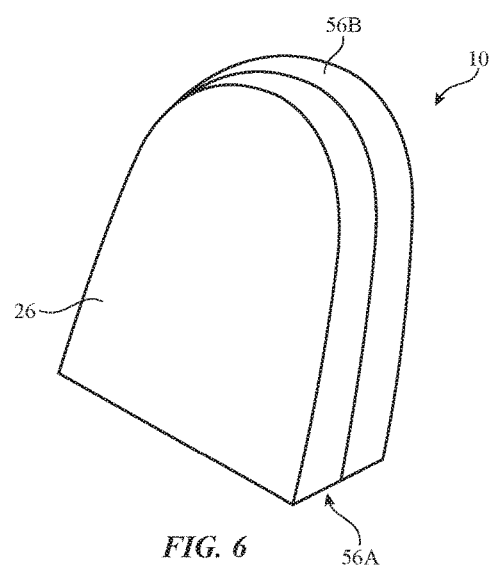
Figure 7:
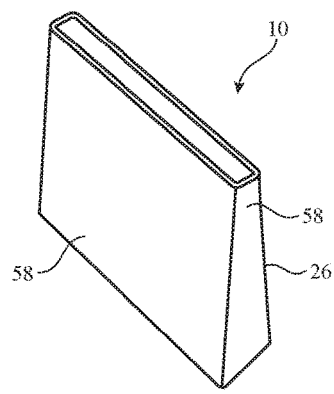
Figure 8:
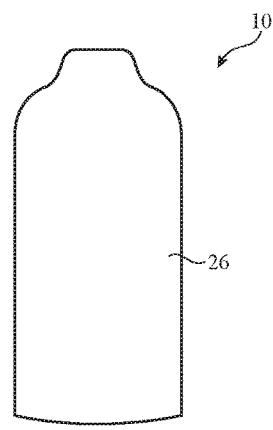

In the example of FIG. 5, layers 26 have been formed into an annular shape (e.g., for a wrist band, a watch, a belt, a head band, an ankle strap, etc.). In the example of FIG. 6, layers 26 have been formed into a backpack shape having a structured and substantially flat lower portion 56A and a curved upper portion 56B. FIG. 7 shows an example in which layers 26 have been formed into a tote bag shape with four structured side portions 58. FIG. 8 shows an example in which layers 26 have been formed into a bottle shape with a circular cross-section and contoured sides.

The examples of FIGS. 4-8 are merely illustrative, however. If desired, layers 26 may be vacuum-formed into a rectangular shape, an oval shape, a spherical shape, a tubular shape, a shape for forming a case for an electronic device, a more complex shape such as a shape that combines flat surfaces, curved surfaces, and/or compound curves, or other suitable shape.

Vacuum forming techniques may be used to form layers 26 into any of the shapes of FIGS. 4-8 or any other suitable shape. With vacuum forming, these three-dimensional shapes may, if desired, be formed from a single piece of fabric (or a single piece of multi-layer fabric such as the multi-layer construction of FIG. 3) instead of requiring multiple separate pieces of fabric to be stitched together. Vacuum forming provides a method of manipulating the fabric without damaging or comprising the functional or cosmetic qualities of the fabric.

Figure 9A:
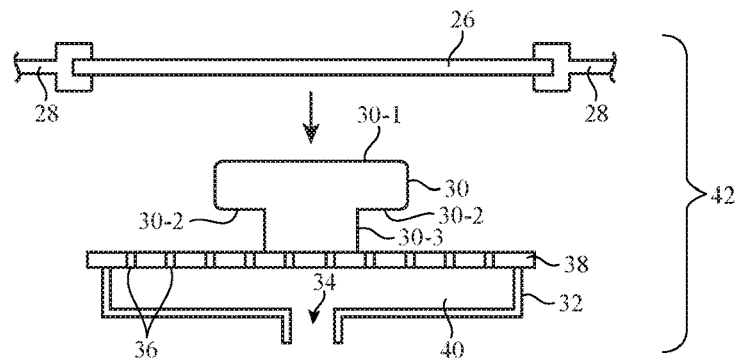
FIGS. 9A, 9B, and 9C show illustrative steps and equipment involved in one suitable method of vacuum forming fabric into a three-dimensional shape in accordance with an embodiment.
Figure 9B:
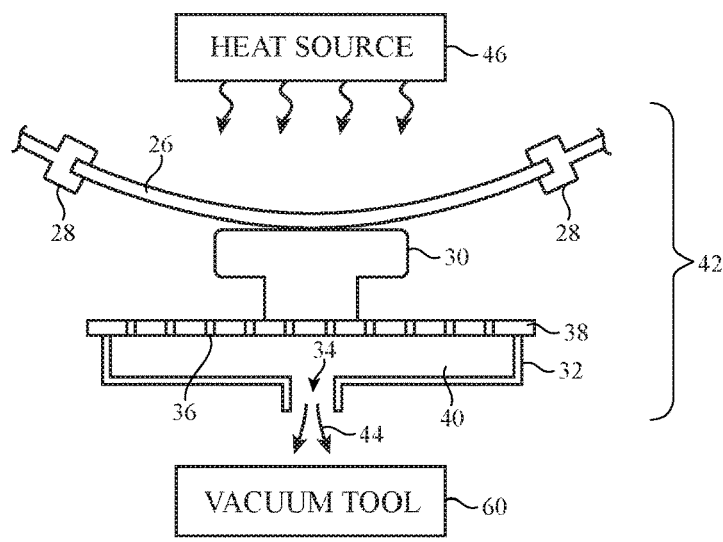
Figure 9C:
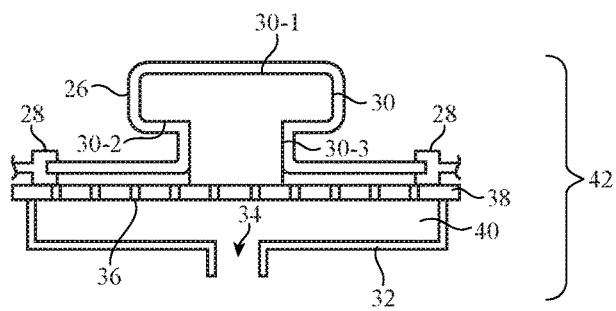

FIGS. 9A, 9B, and 9C show illustrative equipment and steps involved in vacuum-forming layers 26 into a desired three-dimensional shape (e.g., a shape as shown in FIGS. 4-8 or other suitable shape). As shown in FIG. 9A, vacuum-forming equipment 42 may include a chamber 32 surrounding cavity 40 over which plate 38 is located. Plate 38 may be a metal mesh have openings 36 through which air is pulled into chamber 32. Chamber 32 may have one or more openings 34 through which air is pulled out of chamber 32.

A mold such as mold 30 may be placed on plate 38. Mold 30 may be selected based on the desired shape that is to be imparted on layers 26. In the example of FIGS. 9A-9C, mold 30 has a mushroom-like shape with an upper horizontal surface 30-1, an opposing lower horizontal surface 30-2, and a vertical side surface 30-3 extending below the upper and lower surfaces. It should be understood, however, that mold 30 may have any desired shape and may be significantly different from the shape shown in FIG. 9A depending on the desired three-dimensional shape that fabric 12 is to be formed in. Mold 30 may be interchangeable and easily replaced with a mold of a different shape.

Vacuum forming equipment 42 may also include a frame 28 that holds layers 26 during the vacuum forming process. Frame 28 may be operated manually or may be operated using computer-controlled positioners that move frame 28 (and layers 26) into the desired position over chamber 32.

Initially, frame 28 may hold layers 26 over mold 30 in an unheated state as shown in FIG. 9A. Layers 26 may include one or more fabric layers 12 and one or more uncured adhesive layers 48 (FIG. 3). Prior to being heated, layers 26 may be relatively flat.

When layers 26 are in place over mold 30 and chamber 32, heat source 46 may be used to apply heat to layers 26, as shown in FIG. 9B. Heat source 46 may be a heated chamber (e.g., an oven) or may be any other suitable heat source (e.g., a hot element, heated air, etc.). Arrangements when mold 30 itself is heated may also be used.

The application of heat by heat source 46 raises the temperature of the adhesive material in layers 26, causing the adhesive material to become soft and pliable. The adhesive material in layers 26 may, for example, be raised to a temperature between 60° C. and 90° C., between 80° C. and 100° C., between 100° C. and 150° C., between 150° C. and 200° C., between 200° C. and 250° C., etc. The temperature at which the adhesive material becomes moldable is sometimes referred to the forming temperature of the adhesive material.

While layers 26 are heated, a vacuum tool such as vacuum tool 60 may be used to vacuum air 44 out of chamber 32 through opening 34. This causes the air above plate 38 to be pulled into chamber 32 via openings 36. The force of air being pulled into chamber 32 pulls layers 26 down towards plate 38 and mold 30. As layers 26 are pulled downward, layers 26 come into contact with mold 30 and begin to conform to its shape.

After layers 26 have conformed to the shape of mold 30, as shown in FIG. 9C, layers 26 may be cooled while in contact with mold 30. As the adhesive material in layers 26 cools, it becomes more rigid. However, rather than returning to the flat shape of FIG. 9A, the adhesive material hardens into the shape imparted by mold 30. As shown in FIG. 9C, layers 26 have been vacuum-formed into a three-dimensional shape having a portion conforming to upper surface 30-1 of mold 30, a portion conforming to lower surface 30-2 of mold 30, and a portion conforming to vertical side surface 30-3 of mold 30. This example is merely illustrative, however. If desired, mold 30 may impart onto layers 26 one of the three-dimensional shapes of FIGS. 4-8 or may impart any other suitable shape onto layers 26.

Vacuum forming layers 26 into a three-dimensional shape minimizes any damage to layers 26 that may otherwise occur during the forming process. Rather than compressing layers 26 between two structures and potentially altering the texture and appearance of the fabric, one side of layers 26 is pulled against a mold using air and the opposing side of layers 26 is untouched by the mold. This preserves the integrity and texture of the fabric, with the untouched side of layers 26 keeping its original form throughout the forming process. Being able to preserve the original texture and appearance of the fabric may be useful when forming objects of the type shown in FIGS. 4-8. The fabric that is used in forming a bag, for example, may maintain its original look and feel even after being vacuum-formed (as opposed to looking and feeling like the fabric has been compressed or damaged). If desired, the fabric that does not contact mold 30 during the forming process may be used as an outer surface of a three-dimensional object (e.g., the outer surface of a bag or other object).

Figure 10A:
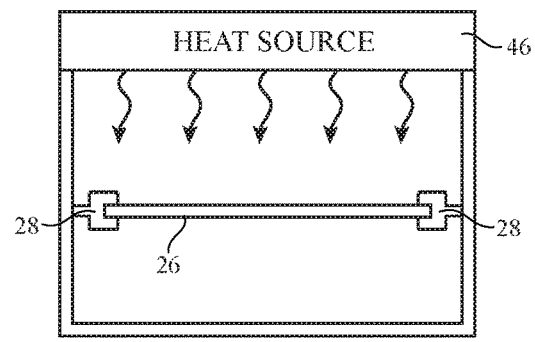
FIGS. 10A, 10B, and 10C show illustrative steps and equipment involved in another suitable method of vacuum forming fabric into a three-dimensional shape in accordance with an embodiment.

The example of FIGS. 9A-9C in which layers 26 are heated during the vacuum forming process (e.g., while vacuum tool 60 is vacuuming air 44 out of chamber 32) is merely illustrative. If desired, layers 26 may be heated prior to vacuum forming. This type of arrangement is illustrated in FIGS. 10A, 10B, and 10C.

Initially, layers 26 may include adhesive material in an uncured state and may be relatively flat. As shown in FIG. 10A, layers 26 may be heated using a heat source 46 to thereby raise the temperature of the adhesive material until it becomes soft and pliable. Heat source 46 may be a heated chamber (e.g., an oven) or may be any other suitable heat source (e.g., a hot element, heated air, etc.).

Figure 10B:
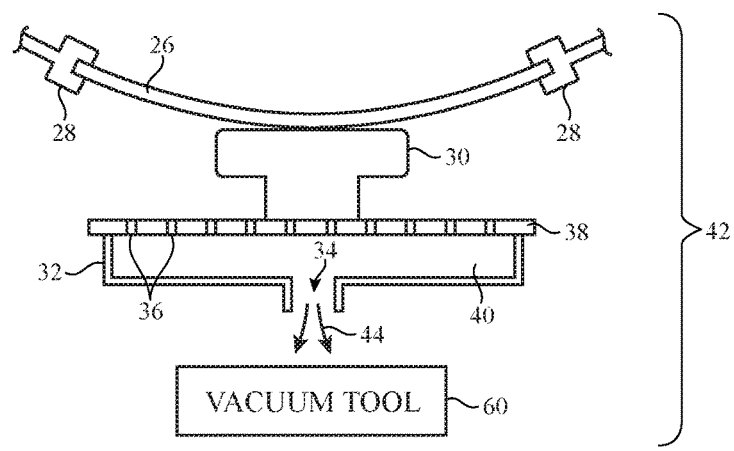

When the adhesive material in layers 26 is heated to the appropriate temperature, layers 26 may be transferred to vacuum forming equipment 42, as shown in FIG. 10B. Vacuum tool 60 may be used to vacuum air 44 out of chamber 32 through opening 34. This causes the air above plate 38 to be pulled into chamber 32 via openings 36. The force of air being pulled into chamber 32 pulls layers 26 down towards plate 38 and mold 30. As layers 26 are pulled downward, layers 26 come into contact with mold 30 and begin to conform to its shape.

Figure 10C:
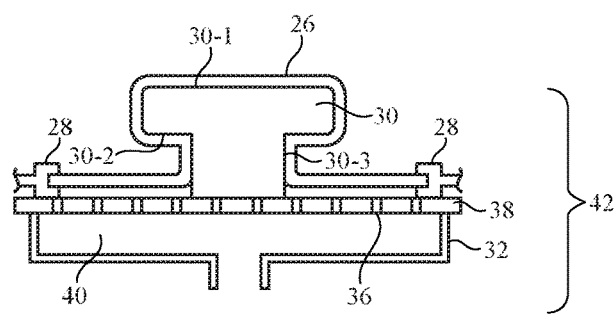

After layers 26 have conformed to the shape of mold 30, as shown in FIG. 10C, layers 26 may be allowed to cool while in contact with mold 30. As the adhesive material in layers 26 cools, it becomes more rigid. However, rather than returning to the flat shape of FIG. 10A, the adhesive material hardens into the shape imparted by mold 30. As shown in FIG. 10C, layers 26 have been vacuum-formed into a three-dimensional shape having a portion conforming to upper surface 30-1 of mold 30, a portion conforming to lower surface 30-2 of mold 30, and a portion conforming to vertical side surface 30-3 of mold 30. This example is merely illustrative, however. If desired, mold 30 may impart onto layers 26 one of the three-dimensional shapes of FIGS. 4-8 or may impart any other suitable shape onto layers 26.

To obtain complex shapes and/or to achieve a desired look and feel of fabric-based item 10, it may be desirable to control how certain regions of layers 26 are affected during the vacuum forming process. For example, it may be desirable to heat some regions of layers 26 while keeping other regions cool. It may be desirable to pull some regions of layers 26 towards mold 30 with greater force than other regions of layers 26. The ability to control and adjust the temperature and vacuum force across layers 26 may help form areas with different textural and/or structural properties. Cosmetic surfaces may be preserved in original form, certain areas may stretch more than others, portions of the fabric may move differently during the vacuum forming process, etc.

Figure 11:
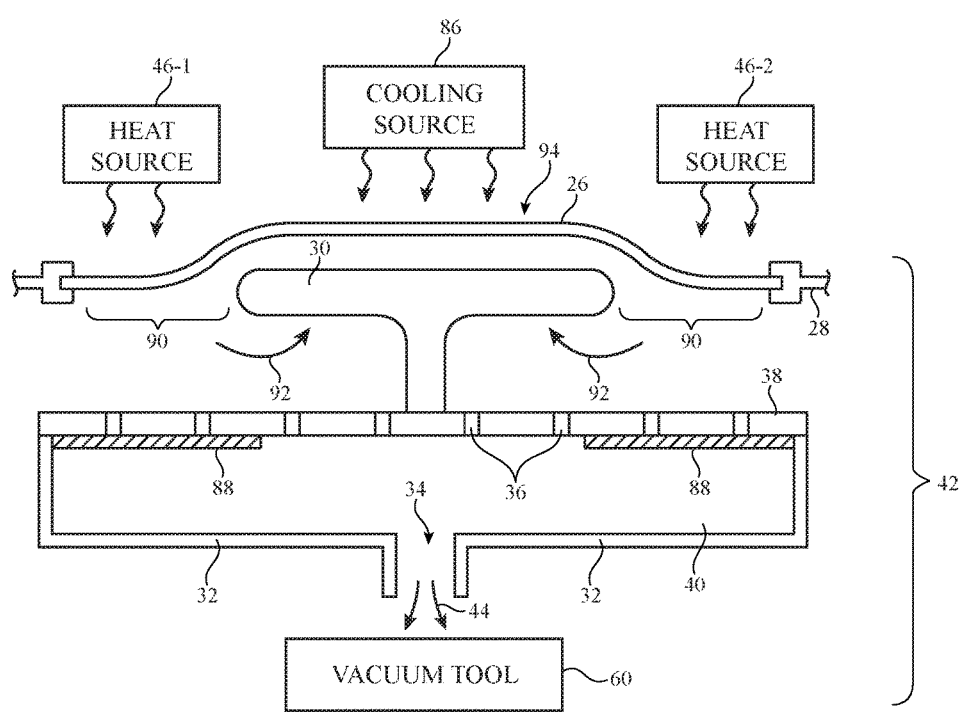
FIG. 11 shows how fabric can be manipulated during the vacuum forming process to achieve varying effects across the fabric in accordance with an embodiment.

FIG. 11 illustrates an example of how layers 26 may be manipulated during vacuum forming to achieve a desired effect. As shown in FIG. 11, some of holes 36 in plate 38 are covered with air blocking material 88, while other holes 36 remain uncovered. In this example, holes 36 underneath mold 30 are uncovered, whereas holes 36 around the perimeter of mold 30 are covered. This causes the outer portions 90 of layers 26 to be pulled inwards and under mold 30 in direction 92.

FIG. 11 also shows how heating and cooling may be selectively applied to layers 26. For example, one or more heat sources such as heat sources 46-1 and 46-2 may apply heat to outer portions 90 of layers 26 while a cooling source such as cooling source 86 keeps central portion 94 of layers 26 cool. This causes outer portions 90 to become more stretchy and flexible than central portion 94. Thus, even after vacuum forming, central portion 94 may remain in substantially the same condition that it was in prior to vacuum forming, whereas outer portions 90 have changed shape and have become slightly stretched.

The example of FIG. 11 is merely illustrative, however. If desired other methods may be used to adjust the shape and structure of layers 26 during vacuum forming. For example, in addition to or instead of using vacuum tool 60 to pull air from under layers 26, a tool that pushes air towards layers 26 (e.g., a fan or other suitable equipment) may be used to blow air onto layers 26 to further manipulate layers 26 during the forming process.

Figure 12:
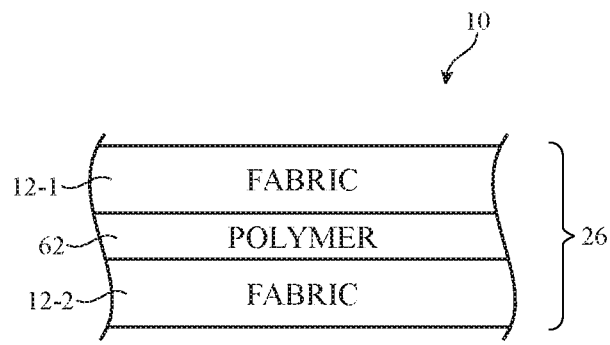
FIG. 12 is a cross-sectional side view of a portion of an illustrative fabric-based item having a polymer layer between fabric layers in accordance with an embodiment.

FIG. 12 shows a cross-sectional side view of illustrative layers that may be included in a fabric-based item having a three-dimensional shape. In the example of FIG. 12, layers 26 include a polymer layer such as polymer layer 62 sandwiched between first and second fabric layers 12-1 and 12-2. Polymer layer 62 may be a structural layer (e.g., one of structural layers 48 of FIG. 3) that helps provide structure and shape to item 10. For example, polymer layer 62 may be a thermoset polymer material (e.g., polyurethane or other thermosetting resin), thermoplastic material (e.g., thermoplastic polyurethane, etc.), or other adhesive material that becomes soft when heated to an appropriate temperature so that layers 26 can be vacuum formed into the desired shape using vacuum forming equipment of the type shown in FIGS. 9A, 9B, 9C, 10A, 10B, and 10C. As polymer layer 62 is heated during the vacuum forming process, it forms mechanical bonds with fabric layers 12-1 and 12-2.

If desired, polymer 62 and fabric layers 12-1 and 12-2 may be laminated together using roll-to-roll lamination equipment. Arrangements where polymer 62 is impregnated in, spray coated onto, or otherwise formed on fabric layers 12 may also be used.

If desired, polymer layer 62 may be located throughout layers 26 or may be located only in select portions of layers 26. For example, polymer layer 62 may be located in regions where it is desired to provide fabric-based item 10 with a structured shape, while other portions of fabric-based item 10 may be free of polymer material 62 so that those portions of fabric-based item 10 remain more slouchy.

Figure 13:
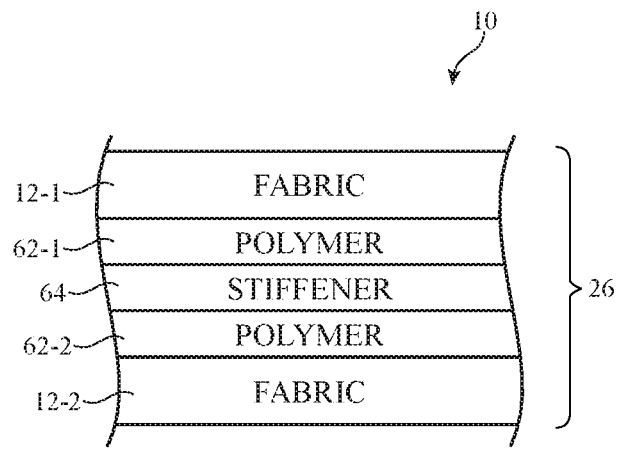
FIG. 13 is a cross-sectional side view of a portion of an illustrative fabric-based item having a stiffener between fabric layers in accordance with an embodiment.

If desired, additional layers may be incorporated into layers 26 to achieve a desired look and feel of fabric-based item 10. In the example of FIG. 13, a stiffening layer such as stiffener 64 is located between first and second polymer layers 62-1 and 62-2, which are sandwiched between first and second fabric layers 12-1 and 12-2. Stiffener 64 may be a layer of polycarbonate, acrylonitrile butadiene styrene (ABS) plastic, an additional fabric layer (e.g., a tightly woven or knitted fabric with some stiffness and rigidity), a layer of metal, ceramic, or other material, or other suitable stiffening layer.

If desired, stiffener 64 may be located throughout layers 26 or may be located only in select portions of layers 26. For example, stiffener 64 may be located in regions where it is desired to provide fabric-based item 10 with additional rigidity and structure, while other portions of fabric-based item 10 may be free of stiffener 64 so that those portions of fabric-based item 10 remain more flexible.

Figure 14:
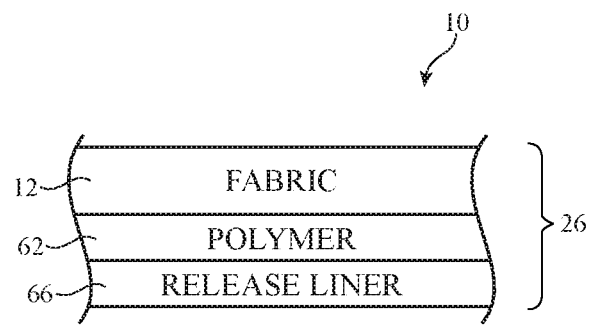
FIG. 14 is a cross-sectional side view of a portion of an illustrative fabric-based item having a release liner that can be removed after vacuum forming in accordance with an embodiment.

If desired, polymer layer 62 may be sandwiched between two different layers, such as a fabric layer and a non-fabric layer. As shown in FIG. 14, for example, polymer layer 62 may be interposed between fabric 12 and release liner 66.

Release liner 66 may be a silicone film or other release liner that allows layers 26 to be handled during manufacturing without polymer layer 62 attaching itself to other materials. For example, layers 26 of FIG. 14 may be vacuum formed into the desired shape and cooled. Once cool, polymer layer 62 will be solidified in the desired shape and release liner 66 may be removed. This allows polymer layer 62 to form an outer surface of layers 26 rather than being sandwiched between two layers of fabric.

Figure 15:
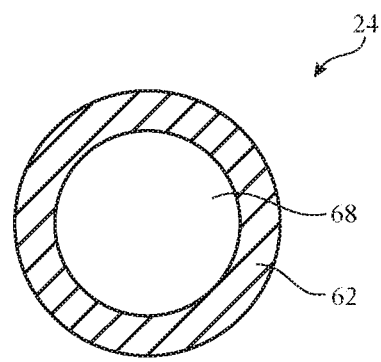
FIG. 15 is a cross-sectional side view of an illustrative strand having a core with a polymer coating in accordance with an embodiment.
Figure 16:
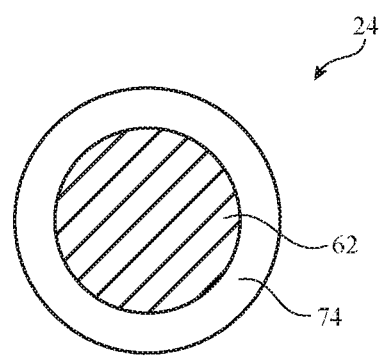
FIG. 16 is a cross-sectional side view of an illustrative strand having a polymer core in accordance with an embodiment.

In some arrangements, polymer material 62 may be incorporated into fabric 12, as shown in FIGS. 15 and 16. In the example of FIG. 15, one or more strands 24 of fabric 12 are formed from a core 68 (e.g., a dielectric or conductive core) that has been coated with polymer material 62. In the example of FIG. 16, one or more strands 24 of fabric 12 are formed from a core of polymer material 62 that has been coated with outer layer 74 (e.g., an insulating outer layer, a conductive outer layer, or other suitable outer layer).

Figure 17:
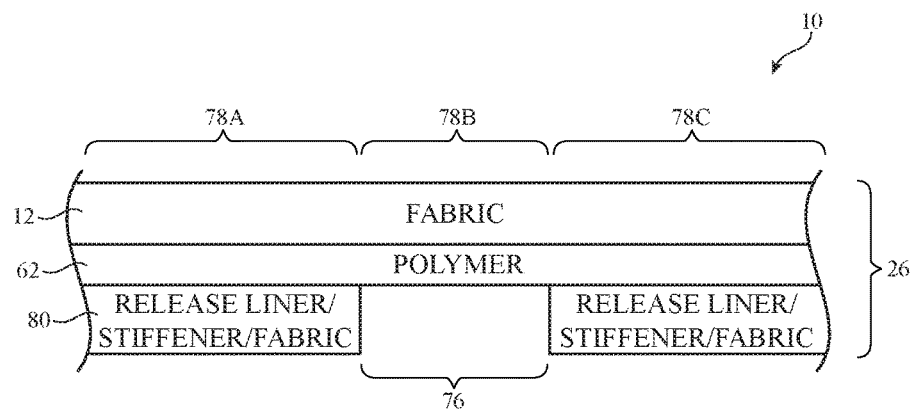
FIG. 17 is a cross-sectional side view of a portion of an illustrative fabric-based item having one or more layers with openings to increase flexibility of the fabric-based item in accordance with an embodiment.
Figure 18:
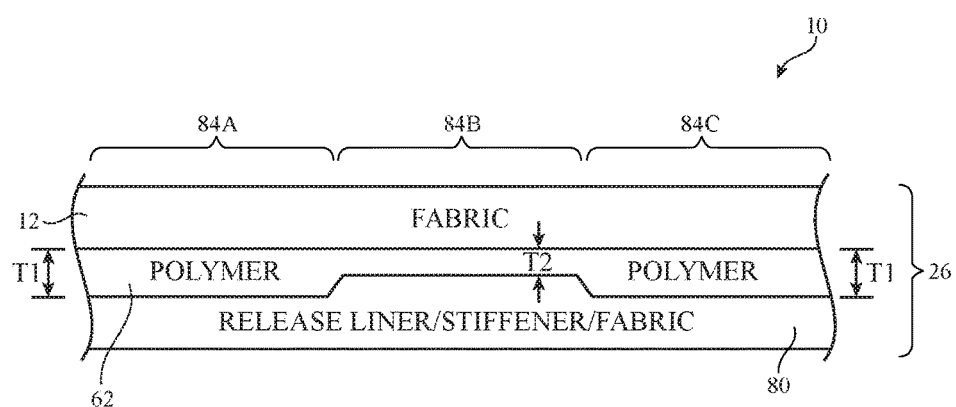
FIG. 18 is a cross-sectional side view of a portion of an illustrative fabric-based item having one or more layers with reduced thickness to increase flexibility of the fabric-based item in accordance with an embodiment.

As discussed in connection with FIG. 4, it may be desirable to have regions of varying stiffness in fabric-based item 10. FIGS. 17 and 18 show illustrative ways in which varying degrees of rigidity and flexibility may be imparted on fabric-based item 10.

In the example of FIG. 17, layers 26 include polymer layer 62 interposed between fabric layer 12 and an additional layer 80. Additional layer 80 may be a release liner (e.g., a release liner of the type shown in FIG. 14), a stiffener (e.g., a stiffener of the type shown in FIG. 13), an additional fabric layer, other suitable layer, or a combination of any two or more of these layers. Additional layer 80 may include an opening such as opening 76. Opening 76 creates a flexible region 78B in layers 26 that is more flexible than adjacent portions 78A and 78C.

Opening 76 may be formed from removed portions of layer 80 or opening 76 may be formed from a gap between two separate sections of layer 80. There may be one, two, three, four, or more than four openings 76 in layers 26 for creating flexible regions such as region 78B. If desired, other layers in layers 26 such as polymer layer 62 may have openings to enhance flexibility. Region 78B may, for example, form a flexible spine between two rigid regions as in the example of FIG. 4, thus allowing fabric-based item 10 to be folded like a book.

If desired, flexible regions such as region 52B of FIG. 4 may be formed by reducing the thickness of one or more layers in item 10. As shown in FIG. 18, for example, polymer layer 62 may have a first thickness T1 in regions 84A and 84C and a second thickness T2 that is less than thickness T1 in region 84B. The reduced thickness of polymer layer 62 in region 84B increases the flexibility of layers 26 in region 84B relative to adjacent portions 84A and 84C.

The foregoing is merely illustrative and various modifications can be made by those skilled in the art without departing from the scope and spirit of the described embodiments. The foregoing embodiments may be implemented individually or in any combination.

What is claimed is:

1. A method for forming a fabric-based item into a three-dimensional shape, wherein the fabric-based item comprises a polymer layer interposed between first and second fabric layers, comprising:
   with a heat source, applying heat to the fabric-based item while the fabric-based item is held by a frame, wherein the polymer layer has first and second portions held within the frame and wherein applying heat to the fabric-based item comprises heating the first portion of the polymer layer while cooling the second portion of the polymer layer;
with a vacuum tool, pulling the fabric-based item onto a mold; and
removing the fabric-based item from the mold.

2. The method defined in claim 1 wherein the mold has a shape and wherein pulling the fabric-based item onto the mold with the vacuum tool comprises pulling the fabric-based item onto the mold with the vacuum tool so that the fabric-based item conforms to the shape of the mold.

3. The method defined in claim 1 further comprising allowing the fabric-based item to cool while the fabric-based item is on the mold.

4. The method defined in claim 1 wherein applying heat to the fabric-based item comprises applying heat to the fabric-based item while pulling the fabric-based item onto the mold with the vacuum tool.

5. The method defined in claim 1 wherein applying heat to the fabric-based item comprises applying heat to the fabric-based item prior to pulling the fabric-based item onto the mold with the vacuum tool.

6. The method defined in claim 1 wherein pulling the fabric-based item onto the mold comprises pulling air through a grid of openings under the mold, the method further comprising:
blocking some of the openings while pulling the fabric-based item onto the mold.

7. The method defined in claim 1 wherein the mold comprises opposing upper and lower surfaces and wherein pulling the fabric-based item onto the mold comprises pulling the fabric-based item onto the upper and lower surfaces of the mold.

8. A method for forming a fabric-based item into a three-dimensional shape, wherein the fabric-based item comprises a layer of fabric and a thermoplastic polymer, the method comprising:
heating the fabric-based item until a temperature of the thermoplastic polymer reaches a forming temperature, wherein the thermoplastic polymer comprises a reduced-thickness region that is thinner than other regions of the thermoplastic polymer;
vacuuming air from under the fabric-based item to bring the fabric-based item in contact with upper and lower opposing surfaces of a mold; and
cooling the fabric-based item while the fabric-based item is in contact with the upper and lower opposing surfaces of the mold.

9. The method defined in claim 8 wherein cooling the fabric-based item comprises hardening the thermoplastic polymer into a shape imparted by the mold.

10. The method defined in claim 9 further comprising removing the fabric-based item from the mold while the thermoplastic polymer holds its shape, wherein the three-dimensional shape of the fabric-based item corresponds to the shape of the thermoplastic polymer imparted by the mold.

11. The method defined in claim 8 wherein heating the fabric-based item comprises selectively heating only a portion of the fabric-based item.

12. The method defined in claim 8 wherein the fabric-based item comprises an additional layer of fabric, wherein the thermoplastic polymer is interposed between the layer of fabric and the additional layer of fabric.

13. The method defined in claim 12 wherein the layer of fabric and the additional layer of fabric have a curved shape and wherein the thermoplastic polymer holds the layer of fabric and the additional layer of fabric in the curved shape after the fabric-based item is cooled.

14. The method defined in claim 12 wherein the thermoplastic polymer comprises thermoplastic polyurethane.

15. The method defined in claim 12 wherein at least one of the layer of fabric and the additional layer of fabric comprises a fabric selected from the group consisting of: a woven fabric and a knit fabric.

16. The method defined in claim 12 wherein the fabric-based item comprises an additional thermoplastic polymer and a stiffener, wherein the stiffener is interposed between the thermoplastic polymer and the additional thermoplastic polymer.

17. The method defined in claim 16 wherein the stiffener comprises an opening.

* * * * *